May 3, 1927.

P. MacGAHAN

MAGNET

Filed Jan. 8, 1924

1,626,681

WITNESSES

INVENTOR
Paul MacGahan
BY
ATTORNEY

Patented May 3, 1927.

UNITED STATES PATENT OFFICE.

1,626,681

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

MAGNET.

Application filed January 8, 1924. Serial No. 684,977.

My invention relates to magnets and particularly to electrical-measuring instrument magnets that are responsive to temperature changes.

One object of my invention is to provide a magnet structure that shall inherently respond to temperature changes to vary the effect of the magnet in accordance with temperature conditions.

Another object of my invention is to provide a bimetallic temperature-responsive element in which at least one of the elements functions as a magnet.

A further object of my invention is to provide a simple, effective and compact means for compensating for the operation of an instrument in accordance with variable thermal conditions.

In practicing my invention, I provide a bimetallic element that is constructed similarly to such elements, as heretofore known, but in which at least one of the metal elements functions as a magnet.

Thus, in electrical measuring instruments and in any other devices, where magnets are employed and where temperature changes vary the effect or function of the magnets, a simple and effective device is provided which compensates for temperature changes.

Figure 1:
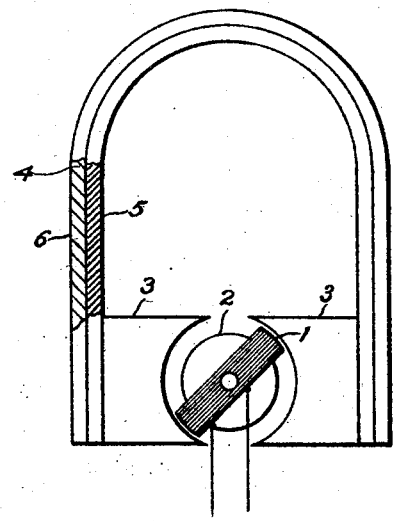
Figure 2:
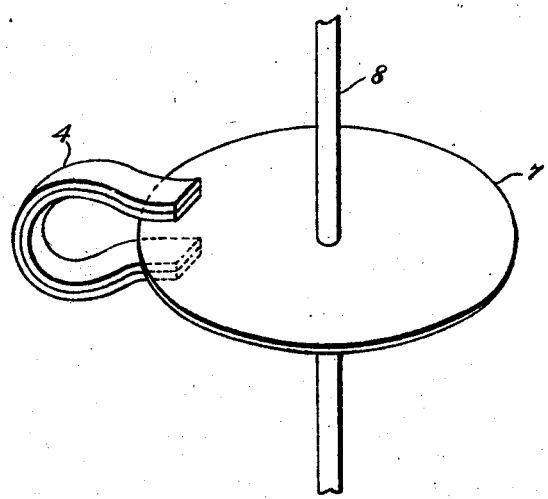

Figure 1 of the accompanying drawings is a diagrammatic view of an indicating electrical measuring instrument employing a bimetallic magnet of my invention, and Fig. 2 is a similar view of the magnet employed as a damping magnet for the damping disk of an integrating or motor meter of a well-known type.

Fig. 1 illustrates an ordinary indicating instrument of the moving-coil type, in which a coil 1 is mounted to pivot about a core member 2 between pole members 3 that are mounted on a bimetallic magnet structure 4.

In this structure, an inner metal strip 5 is the permanent magnet and an outer metal strip 6, intimately secured to the strip 5, by brazing, welding, riveting, rolling or other suitable method as in a usual bimetallic element, is of a material having a greater linear coefficient of thermal expansion than the strip 5. The strip 6 may or may not be of magnetic material, as desired.

With the above structure, increase of temperature will cause the air gap between the pole members 3, or between the pole members 3 and the coil 1, to decrease, thus changing the flux and causing a stronger magnetism in the air gap.

To cause weakening flux with increase of temperature, the metal having the greater linear expansion is placed on the inside of the structure 4, as shown in Fig. 1. Thus, various forms of devices may be provided, such as straight-bar magnets and horse-shoe magnets.

The device is of general application, such for example, as in correcting for inherent temperature errors in watt-hour meters, relays and in any other device wherein it is desired to produce a flux which will vary in intensity in accordance with temperature changes.

In Fig. 2, the magnet structure 4 is shown in the usual damping-magnet relation to a disk 7 mounted on a shaft 8 of a watt-hour meter or other instrument, not shown.

While I have shown and described particular forms of my invention, changes may be effected therein without departing from the spirit and scope thereof, as set forth in the appended claims.

I claim as my invention:

1. In combination, two elements disposed in side-by-side relation and having different thermal coefficients of expansion for effecting lateral movement thereof in response to temperature changes, one of said elements being a magnet element having adjacent poles which are moved relatively by such movement.

2. A magnet structure having adjacent pole portions and a substantially rigid composite body portion joinig the pole portions including a magnetizable element and an element of such thermal coefficient of expansion as to move the pole portions relative to each other in response to temperature changes.

3. A magnet structure having adjacent pole portions and a composite body portion extending between the pole portions including side-by-side related elements extending in the direction of the body between said pole portions, one of said elements being magnetizable and another of such thermal coefficient of expansion as to bend said body portion laterally of said direction to vary the flux between the pole portions in response to temperature changes.

4. A magnet structure comprising a single homogeneous magnetizable element of substantially C-shape and an element of different thermal coefficient of expansion rigidly secured thereto to expand and contract the magnetizable element to thereby move the ends of the magnetizable element relative to each other.

5. A magnet structure comprising a single homogeneous magnetizable element of substantially C-shape and an element of similar shape and of different thermal coefficient of expansion rigidly secured in side-by-side relation thereto to move the ends of the magnetizable element relative to each other in response to temperature changes.

In testimony whereof, I have hereunto subscribed my name this 27th day of December, 1923.

PAUL MacGAHAN.